(12) United States Patent
Sutherland et al.

(10) Patent No.: US 10,562,407 B2
(45) Date of Patent: Feb. 18, 2020

(54) REFRIGERANT SHUT OFF VALVE SIMPLIFICATION

(71) Applicant: Ford Global Technologies, LLC, Dearborn, MI (US)

(72) Inventors: Trent Greear Sutherland, Dearborn, MI (US); Michael Steven Wallis, Belleville, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 157 days.

(21) Appl. No.: 15/836,196

(22) Filed: Dec. 8, 2017

(65) Prior Publication Data

US 2019/0176643 A1    Jun. 13, 2019

(51) Int. Cl.
*B60L 58/26* (2019.01)
*B60H 1/00* (2006.01)
*B60H 1/32* (2006.01)
*B60L 50/60* (2019.01)

(52) U.S. Cl.
CPC .......... *B60L 58/26* (2019.02); *B60H 1/00485* (2013.01); *B60H 1/3202* (2013.01); *B60L 50/66* (2019.02); *B60H 2001/3266* (2013.01); *B60H 2001/3286* (2013.01)

(58) Field of Classification Search
CPC ..... B60L 50/66; B60L 58/26; B60H 1/00485; B60H 1/323; F25B 2313/02331

USPC .................................................. 62/199, 200
See application file for complete search history.

(56) References Cited

U.S. PATENT DOCUMENTS

| 8,402,776 | B2 | 3/2013 | Johnston et al. |
| 9,533,544 | B2 | 1/2017 | Johnston |
| 9,677,790 | B2 | 6/2017 | Sakai et al. |
| 2009/0249807 | A1 | 10/2009 | Nemesh et al. |
| 2010/0064700 | A1* | 3/2010 | Ziehr ............... B60H 1/323 62/84 |
| 2017/0309976 | A1* | 10/2017 | Lambert ......... H01M 10/613 |
| 2018/0281564 | A1* | 10/2018 | Baek .............. F25B 49/02 |

* cited by examiner

*Primary Examiner* — Marc E Norman
(74) *Attorney, Agent, or Firm* — David Kelley; Brooks Kushman P.C.

(57) ABSTRACT

A vehicle system includes a refrigerant loop with a specific arrangement of valves and evaporators or heat exchangers to reduce the number of valves necessary. The vehicle system includes a refrigerant loop that includes a first thermal expansion valve downstream of a condenser and upstream of a first evaporator. A second thermal expansion valve is downstream of the condenser and upstream of a second evaporator. A third thermal expansion valve is upstream of a battery chiller. This arrangement allows for the valves to be simplified such that none of the thermal expansion valve include a binary shut-off valve. A multi-flow position valve may be positioned at a location that combines the outlet of the first and second evaporators.

6 Claims, 4 Drawing Sheets

REFRIGERANT SHUT OFF VALVE SIMPLIFICATION

TECHNICAL FIELD

This disclosure relates to methods and systems for providing climate control for a vehicle. The methods and systems may be particularly useful for vehicles that are solely electrically propelled or vehicles that include hybrid powertrains.

BACKGROUND

It is well known that various systems in a vehicle may be cooled via a fluid (e.g., coolant) system or loop. For example, heating, ventilation, and air conditioning (HVAC) systems in vehicles include a fluid system or loop that exchanges heat to allow the vehicle cabin to be heated or cooled. This HVAC fluid system may contain a plurality of heat exchangers isolated within the HVAC fluid system itself. It is known that the HVAC fluid system and the hybrid powertrain coolant system may be in thermal communication with one another to exchange heat between the two systems.

Such HVAC fluid systems may have three binary state (on/off) refrigerant shut-off valves, one for each heat exchanger, and each valve being upstream of the associated heat exchanger. All three heat exchangers may be supplied with refrigerant from a respective fluid line that branches from a single source such as an AC condenser.

SUMMARY

In one embodiment, a vehicle system includes a refrigerant loop that includes a first expansion device (such as a thermal expansion valve (TXV)) downstream of a condenser and upstream of a first evaporator. A second expansion device is downstream of the condenser and upstream of a second evaporator. A third expansion device is upstream of a battery chiller. None of the expansion devices include a binary shut-off valve.

In another embodiment, a vehicle system includes a refrigerant loop including a first expansion device upstream of a first evaporator for controlling flow of refrigerant through the first evaporator, a second expansion device upstream of a second evaporator for controlling flow of refrigerant through the second evaporator, and a third expansion device upstream of a battery chiller for controlling flow of refrigerant through the battery chiller. Only one of the expansion devices includes a shut-off valve In yet another embodiment, a refrigerant loop is configured to transfer thermal energy to or from a passenger compartment of a vehicle. The refrigerant loop includes a plurality of evaporators, and a plurality of thermal expansion valves. Each valve is upstream of a respective one of the evaporators and each does not include a shut-off valve. A multi-flow position valve is downstream of the evaporators.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
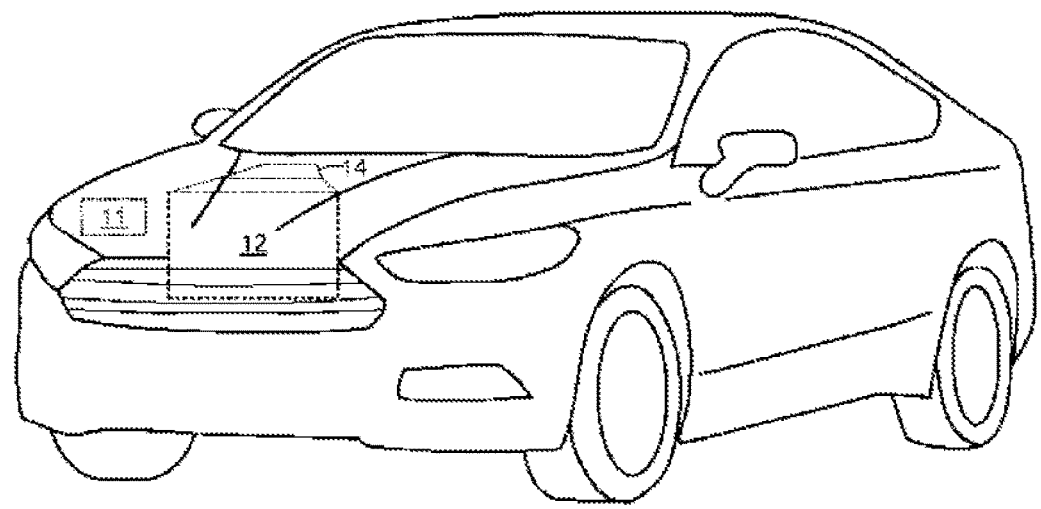
FIG. 1 is a perspective view of a vehicle with a climate control system disclosed herein, according to various embodiments.

The present disclosure is related to a climate control system for a vehicle. The vehicle climate control system may be included in an electric or hybrid vehicle as shown in FIG. 1. Referring to FIG. 1, a vehicle 10 including an engine 12, an electrical machine 14, and an electrical energy storage device 11 is shown. In one example, the vehicle may be propelled solely via the engine 12, solely via the electrical machine 14, or by both the engine 12 and the electrical machine 14. The electrical machine may be supplied electrical power via the electrical energy storage device 11. The electrical energy storage device 11 may be recharged via engine 12 providing power to electrical machine 14 and electrical machine outputting electrical energy to electric energy storage device 11. Alternatively, electrical energy storage device may be recharged via converting the vehicle's kinetic energy into electrical energy via electrical machine 14 during vehicle deceleration or hill descent. Electrical energy storage device 11 may also be recharged from a stationary power grid via a home charging system or a remote charging system (e.g., a charging station). In one example, electrical energy storage device 11 is a battery. Alternatively, electrical energy storage device 11 may be a capacitor or other storage device.

The vehicle 10 may have one power source 12 that may be configured as an internal combustion engine that may be adapted to combust any suitable type of fuel, such as gasoline, diesel fuel, or hydrogen. As another option, vehicle 10 may be configured as a hybrid vehicle that may have a plurality of power sources, such as a non-electrical power source like an engine and an electrical power source. The electrical energy storage device, e.g., a battery, is one example.

The coolant system of the present disclosure may be implemented in various forms of vehicles. For example, U.S. Patent Publication No. 2015/0052913 discloses a vehicle with both a refrigerant loop and a coolant loop according to various embodiments. This is but one example of a vehicle system that the teachings of this disclosure can be implemented into.

Figure 2:
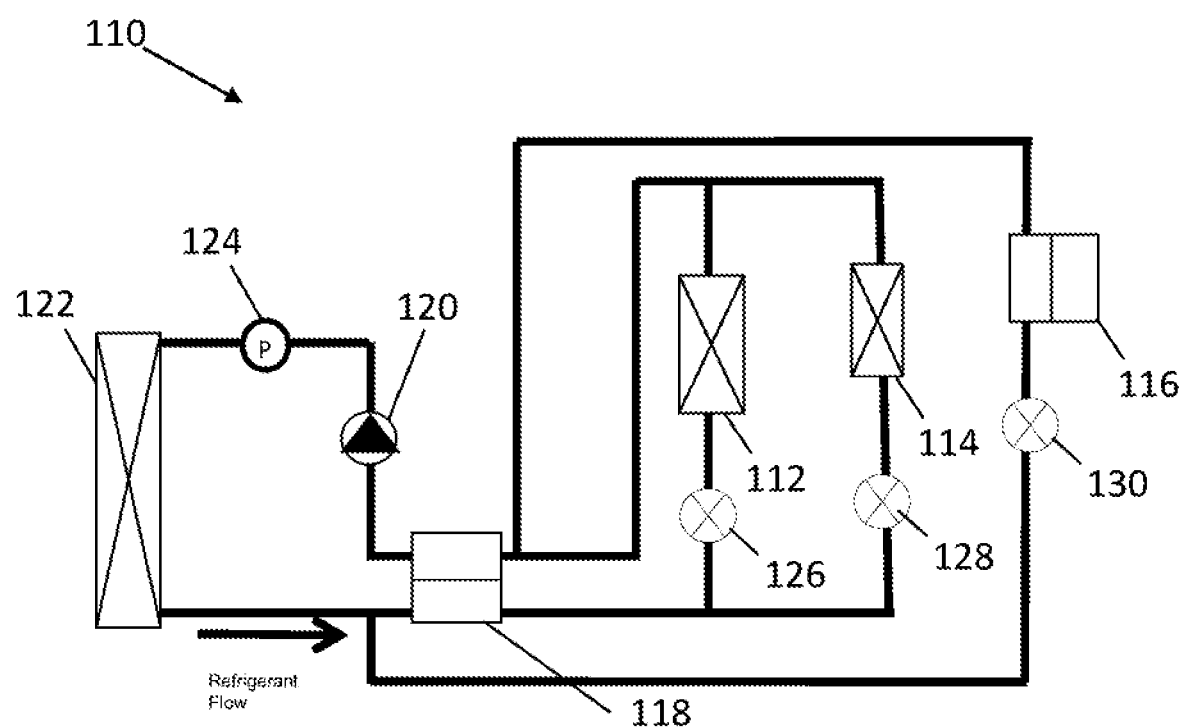
FIG. 2 is an example of a schematic diagram of a refrigerant loop of the climate control system in which fluid sent to a plurality of heat exchangers is controlled by individual shut-off valves.
Figure 3:
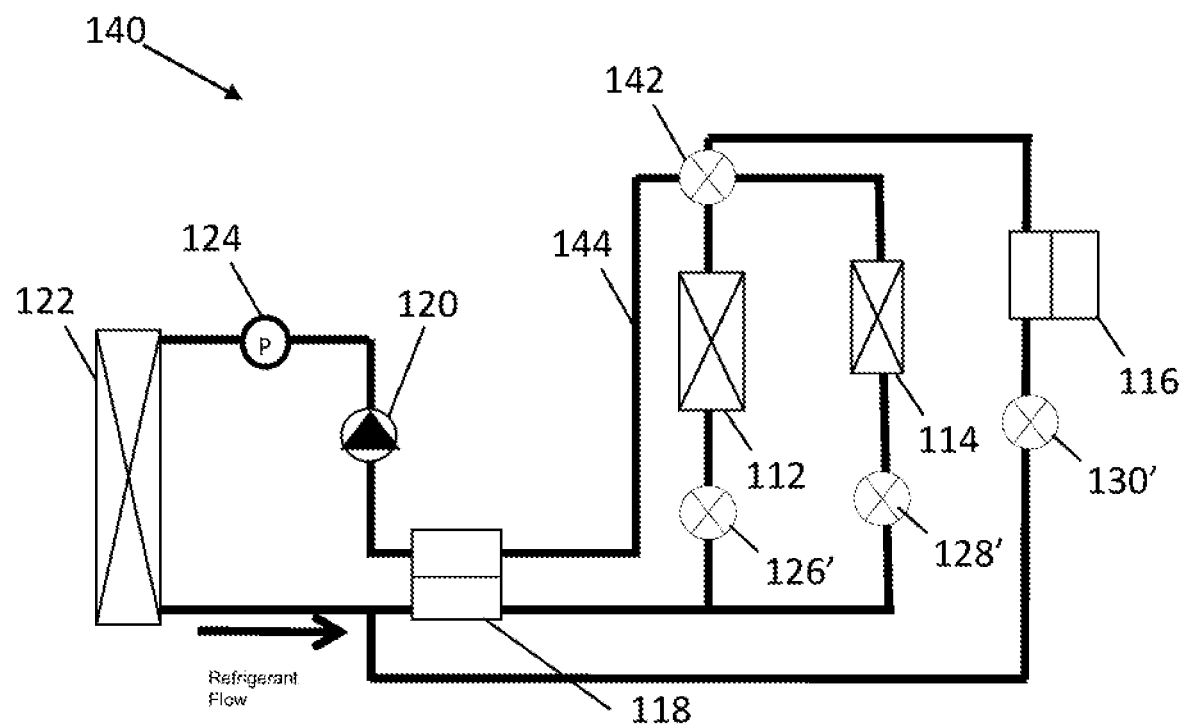
FIG. 3 is an example of a schematic diagram of a refrigerant loop of a climate control system in which the number of shut-off valves is reduced and relocated with respect to the heat exchangers, according to one embodiment.
Figure 4:
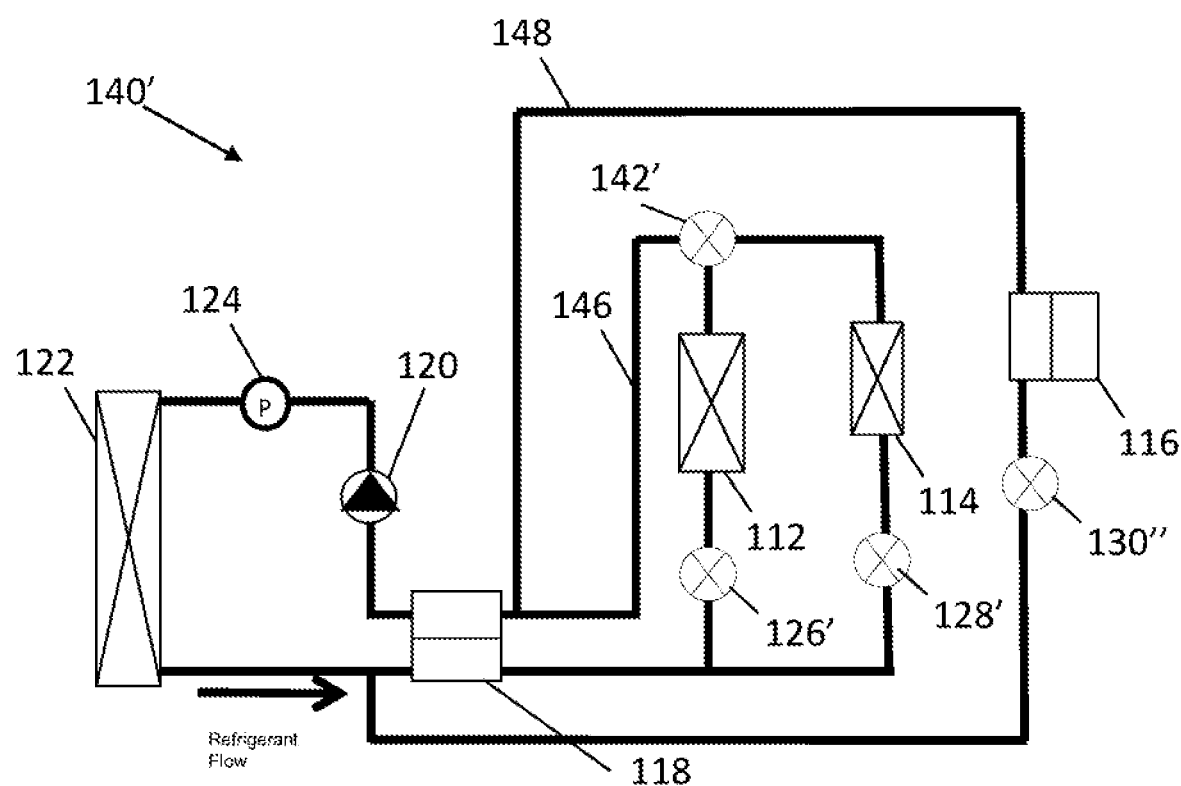
FIG. 4 is another example of a schematic diagram of a refrigerant loop of a climate control system in which the number of shut-off valves is reduced and relocated with respect to the heat exchangers, according to another embodiment.

A simplified illustration of a particular embodiment of a refrigerant loop of a climate control system is provided in FIGS. 2-4. Terms used below are simplified terms but should be given their full breadth of meaning as described in the publication mentioned above. For example, a condenser and an evaporator described below can more broadly be referred to as a heat exchanger, and are one example of a heat exchanger. Moreover, the schematic examples shown in FIGS. 2-4 include a front HVAC evaporator core, a rear HVAC evaporator core, and a battery chiller. These can more broadly be referred to as evaporators, or evaporator cores. The Figures are merely exemplary; teachings of the present disclosure can be applicable to any refrigerant system with more than one evaporative heat exchanger or expansion device, and associated shut off valve(s).

Referring to the embodiment shown in FIG. 2, a simplified refrigerant loop or refrigerant circulation system 110 is illustrated for a vehicle. The vehicle may be a hybrid-electric, electric-only, fuel-cell vehicle, or other like vehicles in which a secondary propulsive source other than an internal combustion engine is provided. The system includes three evaporators or heat exchangers, namely a front HVAC evaporator 112, a rear HVAC evaporator 114, and a battery chiller 116. The battery chiller may be a compact plate-to-plate heat exchanger configured to transfer thermal energy from the battery coolant loop to the vehicle's refrigerant loop to maintain optimum battery temperatures. An internal heat exchanger (IHX) 118 may also be provided upstream of the front and rear evaporators 112, 114. In another embodiment, the IHX 118 is not present.

Also provided in the system 110 is a pump or compressor 120 that pumps the refrigerant or fluid to an exterior heat exchanger or condenser 122. A pressure sensor 124 may be located on the outlet of the compressor 120 or between the compressor and the condenser 122 and provide feedback data to a controller that alters the output of the compressor if needed. Some of the refrigerant is then pumped to the internal heat exchanger 118 where it is selectively sent to none, one, or both of the evaporators 112, 114, while some of the refrigerant is pumped to the battery chiller 116.

Three binary state (on/off) refrigerant shut off valves are provided, one for each evaporator 112, 114, 116. In particular, a front expansion device such as a thermal expansion valve 126 is provided upstream of the front HVAC evaporator 112, a rear expansion device 128 is provided upstream of the rear HVAC evaporator 114, and a battery chiller expansion device 130 is provided upstream of the battery chiller 116. While references to "expansion devices" may include thermal expansion valves as illustrated, other embodiments to which this disclosure is applicable to include electronic expansion valves (EXVs), orifice tubes, etc.

All three evaporators 112, 114, 116 may be selectively supplied with refrigerant from a single source (condenser 122), and branch off from a single refrigerant line to feed each separate evaporator. The corresponding shut-off valves are built into individual refrigerant line branches to supply each evaporator.

The system may be subjected to a large spike in system refrigerant pressure when the two HVAC shut-off valves 126, 128 are closed and the battery chiller shut-off valve 130 is open. While this is a desired operating condition for this vehicle, the refrigerant pressures encountered are undesirable.

Therefore, according to various embodiments of this disclosure, additional systems are illustrated in which the number of refrigerant shut-off valves are reduced and relocated within the refrigerant system. As will be described below in further detail, some of the shut-off valves are combined and relocated downstream of the evaporators, on the return refrigerant line from the evaporators toward the compressor. Two such embodiments are illustrated in FIGS. 3-4, which were merely examples of possible configurations.

Referring to FIG. 3, one embodiment of an HVAC refrigerant system 140 is provided in which a single, multi-flow position valve 142 is located where all return refrigerant lines recombine at the valve 142 that outputs into a single refrigerant line 144 connecting to the compressor or pump. In particular, each of the front HVAC evaporator 112, the rear HVAC evaporator 114, and the battery chiller 116 has an inlet (or upstream) side and an outlet (or downstream) side. Again, each of the inlets are provided with an expansion device. However, in this embodiment, the expansion devices 126', 128', and 130' are not provided with binary (on/off) features. In other words, the expansion devices do not include a binary shut-off valve. Instead, a multi-flow position valve 142 is placed downstream of the evaporators 112, 114, 116 in a location where the outlets from these evaporators combines. The multi-flow position valve 142 in combination with the valves 126', 128' and 130' controls which outlets are fed into the compressor 120. Binary flow valves allow or prevent fluid flow through them. In contrast, multi-position flow valves allow, via some mechanism, various combinations of inlet flows to be combined into a single outlet flow. Multi-position flow valves allow more control than a binary flow valve, ranging from all inlet flow being prevented, to a single inlet flow to a single outlet flow, up to and including combining all inlet flows into the single outlet flow. The illustrated configurations allows for a specific control of which heat exchangers are supplied with refrigerant without having binary (on/off) valves upstream of the evaporators and battery chiller, while avoiding the high system pressure situation described above. This configuration also avoids any unintended cooling to the customer or vehicle occupant.

Referring to FIG. 4, another embodiment of the HVAC refrigerant system 140' is illustrated. In this embodiment, the multi-flow position valve 142' now only receives fluid from the outlet of the front HVAC evaporator 112 and the rear HVAC evaporator 114. These two lines are combined at the valve 142' into a single refrigerant line 146. In this embodiment, the valve 130" now includes a binary (on/off) shutoff feature. The outlet of the battery chiller 116 bypasses the valve 142' in which the outlet line 148 of the battery chiller 116 combines with line 146 downstream of the evaporators 112, 114 and upstream of the optional internal heat exchanger 118. This configuration also allows for a specific control of which heat exchangers are supplied with refrigerant as well as binary (on/off) refrigerant flow control over the battery chiller 116 while avoiding the high system pressure situation described above. This configuration also avoids any unintended cooling to the customer or vehicle occupant.

In the embodiment of FIG. 4, the multi-flow position valve 142' does not include a binary state (on/off) shutoff feature. In another embodiment not shown, the valve 142' is instead a binary state (on/off) shutoff valve. This provides the refrigerant loop with two binary (on/off) shutoff valves—one downstream of the front and rear evaporators 112, 114, and one upstream of the battery chiller 116.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A vehicle system, comprising:
   a refrigerant loop including:
   a first expansion device downstream of a condenser and upstream of a first evaporator,
   a second expansion device downstream of the condenser and upstream of a second evaporator,
   a third expansion device upstream of a battery chillier, and
   a multi-flow position valve downstream of the first evaporator, the second evaporator, and the battery chiller,
   wherein none of the expansion devices include a binary shut-off valve.

2. The vehicle system of claim 1, wherein the multi-flow position valve combines refrigerant passed through the first evaporator, the second evaporator, and the battery chiller into a single refrigerant line.

3. The vehicle system of claim 2, wherein the single refrigerant line passes refrigerant through an internal heat exchanger (IHX) and the IHX is configured to transfer heat between refrigerant upstream of the battery chiller and refrigerant downstream of the first, second, and third expansion devices.

4. The vehicle system of claim 1, wherein the multi-flow position valve is not a binary shut-off valve configured to stop refrigerant flow through the multi-flow position valve.

5. The vehicle system of claim 1, wherein the refrigerant loop does not include a binary shut-off valve configured to stop refrigerant flow through an associated thermal expansion valve.

6. The vehicle system of claim 1, Wherein the first evaporator is a front HVAC evaporator core configured to transfer heat to a system that controls a climate of a front of the vehicle, and the second evaporator is a rear HVAC evaporator core configured to transfer heat to a system that controls a climate of a rear of the vehicle.

* * * * *